US007249419B2

(12) United States Patent
Sato

(10) Patent No.: US 7,249,419 B2
(45) Date of Patent: Jul. 31, 2007

(54) PORTABLE TERMINAL APPARATUS WITH AUTO CALIBLATION OF ORIENTATION MEASUREMENT

(75) Inventor: Hideki Sato, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 11/359,485

(22) Filed: Feb. 23, 2006

(65) Prior Publication Data

US 2006/0185182 A1   Aug. 24, 2006

(30) Foreign Application Priority Data

Feb. 23, 2005   (JP)   ............... 2005-046724

(51) Int. Cl.
*G01C 17/38*   (2006.01)
(52) U.S. Cl. .......................... 33/356; 33/366
(58) Field of Classification Search ............. 33/355 R, 33/356, 357, 358, 359, 365, 366
See application file for complete search history.

(56) References Cited

U.S. PATENT DOCUMENTS

| 5,297,063 | A | * | 3/1994 | Cage ........................... 33/356 |
| 5,349,529 | A | * | 9/1994 | Masumoto et al. ............ 33/357 |
| 5,511,319 | A | * | 4/1996 | Geerlings et al. ............. 33/356 |
| 2001/0042314 | A1 | * | 11/2001 | Kato ........................... 33/356 |
| 2002/0023362 | A1 | * | 2/2002 | Kato ........................... 33/356 |
| 2002/0083605 | A1 | * | 7/2002 | Blank et al. .................. 33/356 |
| 2003/0041466 | A1 | * | 3/2003 | Kato ........................... 33/356 |
| 2004/0098873 | A1 | * | 5/2004 | Lam et al. ................ 33/363 R |
| 2005/0150122 | A1 | * | 7/2005 | Cho et al. ..................... 33/356 |
| 2006/0168832 | A1 | * | 8/2006 | Yasui et al. ................... 33/356 |
| 2007/0033818 | A1 | * | 2/2007 | Kitamura et al. ......... 33/355 R |

FOREIGN PATENT DOCUMENTS

JP   2004-101273   4/2004

* cited by examiner

*Primary Examiner*—G. Bradley Bennett
(74) *Attorney, Agent, or Firm*—Dickstein, Shapiro, LLP.

(57) ABSTRACT

A portable terminal apparatus is mounted in a casing and has a magnetic sensor that detects a magnetic field around the casing with an offset and outputs magnetic data representing the detected magnetic field, and a tilt sensor that detects a tilt of the casing and sequentially outputs tilt data representing the detected tilt. In the portable terminal apparatus, a capture part sequentially captures the magnetic data from the magnetic sensor at a given time interval. A calculation part calculates the offset of the magnetic sensor based on a plurality of the magnetic data sequentially captured by the capture part. A detection part detects an orientation variation of the casing based on the tilt data sequentially outputted from the tilt sensor. A change part changes the time interval for sequentially capturing the magnetic data in accordance with the detected orientation variation.

7 Claims, 5 Drawing Sheets

PORTABLE TERMINAL APPARATUS WITH AUTO CALIBLATION OF ORIENTATION MEASUREMENT

BACKGROUND OF THE INVENTION

1. Field of the Invention

The present invention relates to a technique to calibrate orientation measured in a portable terminal apparatus including a magnetic sensor to detect the orientation and a tilt sensor to detect a tilt, by periodically capturing magnetic data and calculating an offset due to a magnetic field, and particularly to a technique to suitably control a capture time interval of the magnetic data correspondingly to movement of the portable terminal apparatus.

2. Description of the Related Art

In recent years, a portable terminal apparatus such as a cellular phone has been advanced in function, and one including a magnetic sensor to detect the earth magnetism (geomagnetism) in order to measure azimuth orientation and a tilt sensor to detect the tilt of a device casing has been developed. Besides, in portable terminal apparatuses including magnetic sensors, there is one provided with an auto-calibration function to correct an error (offset) due to internal magnetic field generated by an electronic part in the inside of the portable terminal apparatus.

In a conventional auto-calibration function, magnetic data is periodically captured and is stored, and a specified calibration process is performed. As the calibration process, for example, a method is adopted in which the magnetic data is collected over a certain range of orientation through which the portable terminal apparatus is turned, and then, an azimuth sphere is calculated from the collected data, and the offset is set in terms of deviation of the sphere center from an origin and updated because the offset varies along the passage of time.

As this kind of related art, there is also one disclosed in patent document 1. This document discloses a technique in which a measurement rod having a magnetic sensor is arbitrarily rotated, and a detected position coordinate is compared with a position coordinate separately obtained by calculation, so that an error correspondence table is set and updated.

[Patent Document] JP-A-2004-101273

In the foregoing related art, there has been a problem that due to the variety of usage pattern of the portable terminal apparatus, it is difficult to suitably set a sampling time of magnetic data.

That is, in a normal use environment of the portable terminal apparatus, the tilt of the device casing and the orientation are not necessarily changed frequently. In the case where the tilt or the orientation is not changed very much, there occurs a noticeable harmful effect that meaningless data without variation in orientation is stored even if the sampling time is shortened. On the other hand, like a case where the user intentionally swings the device casing in order to cause calibration to be performed, there is also a conceivable case where the tilt and orientation are significantly changed in a short time. In this case, when the sampling time is short, the accumulation of magnetic data necessary for the calibration can be completed in a short time, however, when the sampling time is long, it takes time to collect and store magnetic data, and there occurs a disadvantage that the user is urged to perform the swing operation for a long time. Patent document 1 does not disclose a technique to solve such problems.

SUMMARY OF THE INVENTION

The invention has been made in view of such circumstances and has an object to provide a technique in which a portable terminal apparatus includes a magnetic sensor to detect an orientation, a tilt sensor to detect a tilt, and a control part that periodically captures magnetic data to calculate an offset, wherein a capture time interval of the magnetic data is suitably controlled correspondingly to movement of the portable terminal apparatus.

In order to achieve the object, according to a first aspect of the invention, a portable terminal apparatus mounted in a casing, comprises: a magnetic sensor that detects a magnetic field around the casing with an offset and outputs magnetic data representing the detected magnetic field; a tilt sensor that detects a tilt of the casing and sequentially outputs tilt data representing the detected tilt; a capture part that sequentially captures the magnetic data from the magnetic sensor at a given time interval; a calculation part that calculates the offset of the magnetic sensor based on a plurality of the magnetic data sequentially captured by the capture part; a detection part that detects an orientation variation of the casing based on the tilt data sequentially outputted from the tilt sensor; and a change part that changes the time interval for sequentially capturing the magnetic data in accordance with the detected orientation variation.

According to a second aspect of the invention, in the portable terminal apparatus of the first aspect, the detection part detects the orientation variation of the casing in terms of a temporal variation of the tilt data sequentially outputted from the tilt sensor.

According to a third aspect of the invention, in the portable terminal apparatus of the first aspect, the tilt sensor outputs the tilt data composed of a widthwise component representing a tilt in a widthwise direction of the casing and a lengthwise component representing a tilt in a lengthwise direction of the casing, and the detection part detects the orientation variation of the casing based on the widthwise components of the tilt data sequentially outputted from the tilt sensor. Incidentally, only the third aspect relates to the subject matter relating to the casing, and the subject matter does not naturally influence the technical scope of the invention according to the first or second aspect.

According to a fourth aspect of the invention, the capture part sequentially captures the magnetic data at a normal time interval, and the change part changes the normal time interval to a fast time interval which is shorter than the normal time interval when a degree of the detected orientation variation exceeds a predetermined threshold level. Further, the change part maintains the fast time interval over a predetermined period even when the degree of the detected orientation variation falls below the predetermined threshold level within the predetermined period.

According to a fifth aspect of the invention, an offset calibration method is performed in a portable terminal apparatus being mounted in a casing and having a magnetic sensor which detects a magnetic field around the casing with an offset and outputs magnetic data representing the detected magnetic field and a tilt sensor which sequentially detects a tilt of the casing and outputs tilt data representing the detected tilt. The offset calibration method comprises the steps of: sequentially capturing the magnetic data from the magnetic sensor at a given time interval; calculating the offset of the magnetic sensor based on a plurality of the sequentially captured magnetic data; detecting an orientation variation of the casing based on the tilt data sequentially outputted from the tilt sensor; and changing the time interval for sequentially capturing the magnetic data in accordance with the detected orientation variation.

According to a sixth aspect of the invention, a machine readable medium is provided for use in a portable terminal apparatus being mounted in a casing and having a processor, a magnetic sensor which detects a magnetic field around the casing with an offset and outputs magnetic data representing the detected magnetic field, and a tilt sensor which sequentially detects a tilt of the casing and outputs tilt data representing the detected tilt. The machine readable medium contains a program executable by the processor for causing the portable terminal apparatus to perform an offset calibration method comprising the steps of: sequentially capturing the magnetic data from the magnetic sensor at a given time interval; calculating the offset of the magnetic sensor based on a plurality of the sequentially captured magnetic data; detecting an orientation variation of the casing based on the tilt data sequentially outputted from the tilt sensor; and changing the time interval for sequentially capturing the magnetic data in accordance with the detected orientation variation.

According to the invention, attention is paid to a fact that when the portable terminal apparatus makes a behavior of a noticeable orientation variation such as a swing, there is a tendency that the tilt of the portable terminal apparatus also significantly varies. Thus, a parameter as the index of the orientation variation of the portable terminal apparatus is acquired from the detected tilt of the tilt sensor, and the length of the sampling time interval of the magnetic data is set correlatively to this parameter. By this, in the case where the orientation variation is small, the capture amount of the magnetic data is made small, and the control load can be reduced. On the other hand, in the case where the orientation variation is large, the capture of the necessary magnetic data can be completed in a short time. Accordingly, when consideration is given especially to the case where the user intentionally swings the portable terminal apparatus in order to calculate the offset of magnetic data, the necessary time in which the swing operation is continued can be shortened, and accordingly, there occurs a merit that the work load of the operator can be reduced.

Besides, the temporal variation of the tilt data of the tilt sensor is calculated, and the calculation result is made as the index of the orientation variation of the portable terminal apparatus, and accordingly, there occurs a merit that the variation of the tilt of the portable terminal apparatus is certainly recognized and reflected on the control of the orientation sampling time interval.

Besides, the tilt of the portable terminal apparatus in the casing widthwise direction is acquired from the detected tilt data of the tilt sensor, and the tilt in the casing widthwise direction is made as the index of the orientation variation of the portable terminal apparatus, and accordingly, there occurs a merit that a monitor process of the detected tilt is simplified, and the control load at the regular time can be reduced.

DETAILED DESCRIPTION OF THE INVENTION

Hereinafter, embodiments of the invention will be described with reference to the drawings.

Figure 1:
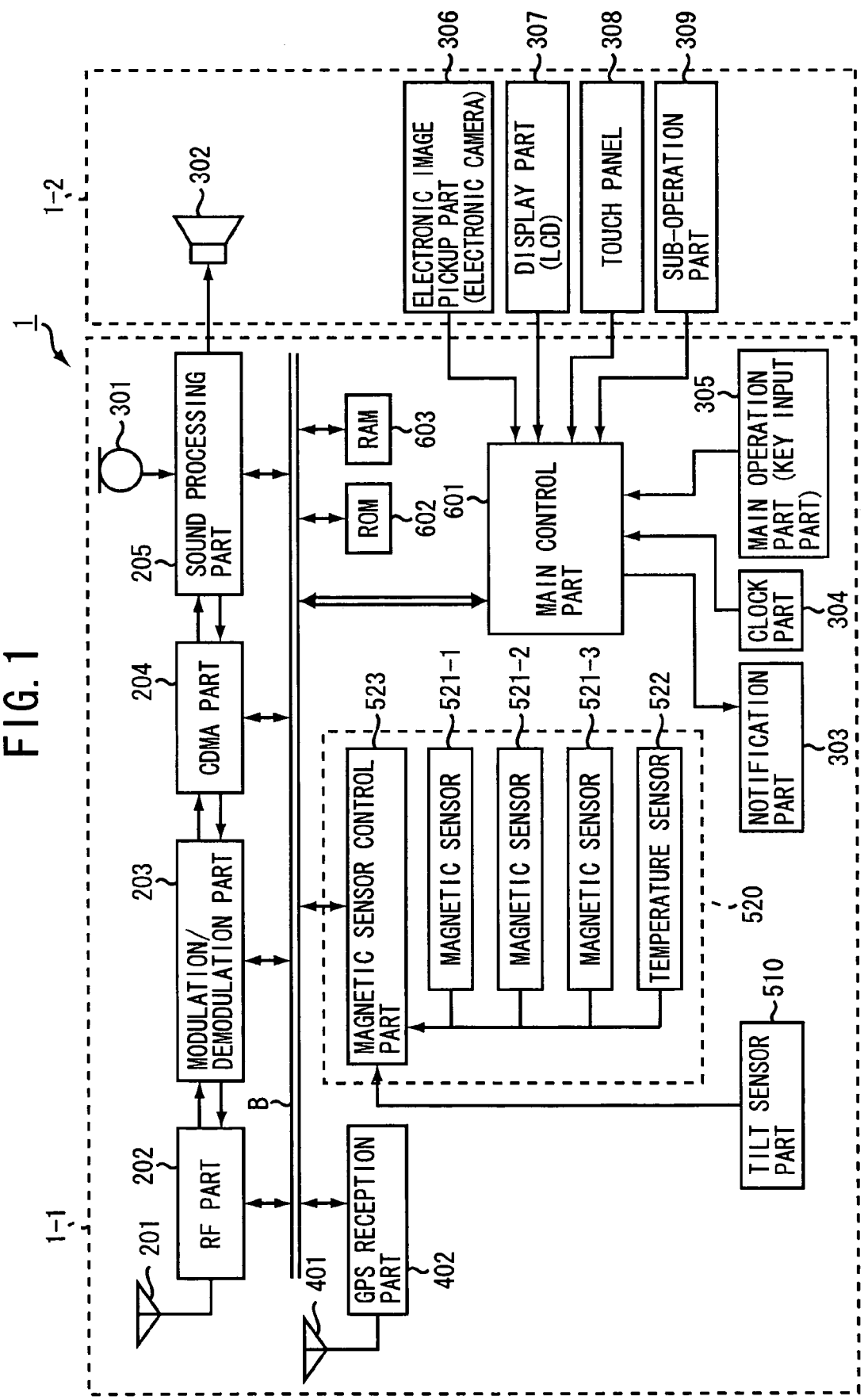
FIG. 1 is a block diagram showing the outline of a portable terminal apparatus according to an embodiment of the invention.

FIG. 1 is a block diagram showing the outline of a cellular phone according to an embodiment of the invention. As shown in the drawing, a cellular phone 1 is a foldable and portable terminal apparatus including two casings of terminal units 1-1 and 1-2. An antenna 201 is provided to perform transmission/reception of a radio signal to/from a not-shown wireless base station. An RF (Radio Frequency) part 202 converts a reception signal received by the antenna 201 into a reception signal of an intermediate frequency and outputs it to a modulation/demodulation part 203. Further, the RF part 202 modulates a transmission signal inputted from the modulation/demodulation part 203 into a signal of a transmission frequency, outputs it to the antenna 201 and performs transmission as well.

The modulation/demodulation part 203 performs a demodulation process of the reception signal inputted from the RF part 202 and a modulation process of the transmission signal inputted from a CDMA (Code Division Multiple Access) part 204. The CDMA part 204 performs an encoding process of the transmission signal and a decoding process of the reception signal. A sound processing part 205 converts a sound signal inputted from a microphone 301 into a digital signal and outputs it to the CDMA part 204, and further receives a digital sound signal from the CDMA part 204, converts it into an analog sound signal, and outputs it to a speaker 302 to make a sound.

Another antenna 401 is provided for receiving a radio signal from a GPS (Global Positioning System) satellite. A GPS reception part 402 demodulates the radio signal received from the GPS satellite, and calculates, based on the radio signal, the position of the portable terminal apparatus 1 expressed by latitude and longitude (and height or the like in the case of a three-dimensional mode).

Figure 2:
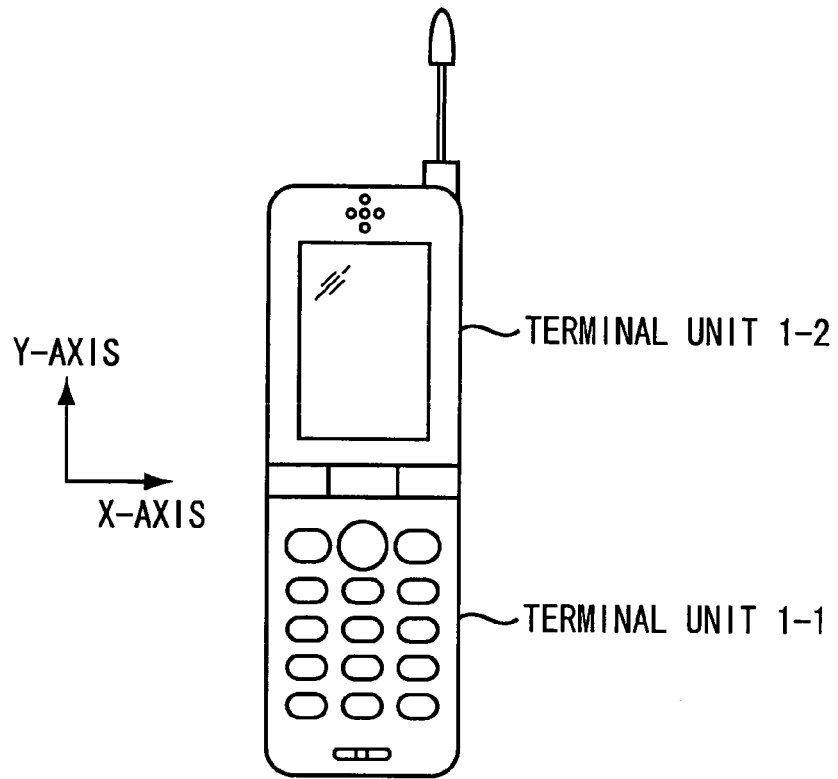
FIG. 2 is a front view showing a terminal cellular phone in a state where a terminal unit thereof is opened.

A tilt sensor part 510 is provided for detecting a tilt of the terminal unit 1-1 and outputting tilt data representing the detected tilt. Here, FIG. 2 is a front view showing a state where the terminal units 1-1 and 1-2 of the cellular phone 1 are opened, and an X-axis and a Y-axis are set in the directions indicated by arrows in the drawing. Referring back to FIG. 1, in this embodiment, the tilt sensor part 510 includes accelerator sensors in the X-axis and Y-axis directions to detect gravitational acceleration components in the X-axis and Y-axis directions.

A magnetic sensor part 520 includes magnetic sensor 521-1 to 521-3, a temperature sensor 522 and a magnetic sensor control part 523. The magnetic sensors 521-1 to 521-3 detect geo magnetism (magnetic field around the casing) in the respective axial directions of the X-axis, Y-axis and Z-axis orthogonal to each other, and output them as magnetic data. The temperature sensor 522 detects temperature to perform temperature compensation of the magnetic sensors 521-1 to 521-3. The magnetic sensor control part 523 performs specified data processing on the detection outputs of the respective sensors 521-1 to 521-3 and 522 and the tilt sensor part 510, and makes an output.

A main control part 601 is a CPU (Central Process Unit) type control part to perform the main control of the portable terminal apparatus 1. A ROM (Read Only Memory) 602 and a RAM (Random Access Memory) 603 are memories constituting a main memory of the main control part 601.

A notification part 303 includes a speaker, a vibrator, a light-emitting diode and the like, and notifies the user of call incoming, mail reception, or the like by sound, vibration, light or the like. A clock part 304 is a timing function part used by the main control part 601. A main operation part 305 captures user's instruction input and gives it to the main control part 601.

An electronic image pickup part 306 converts an image of a subject into a digital signal and outputs it to the main control part 601. A display part 307 is composed of a liquid crystal display panel (LCD) to display an image, a character and the like based on a signal for display inputted from the main control part 601. A touch panel 308 is mounted in the surface of the liquid crystal display panel of the display part 307, and outputs a signal to indicate input contents by a user's touch operation to the main control part 601. A sub-operation part 309 is composed of a push switch used for display switching.

Figure 3:
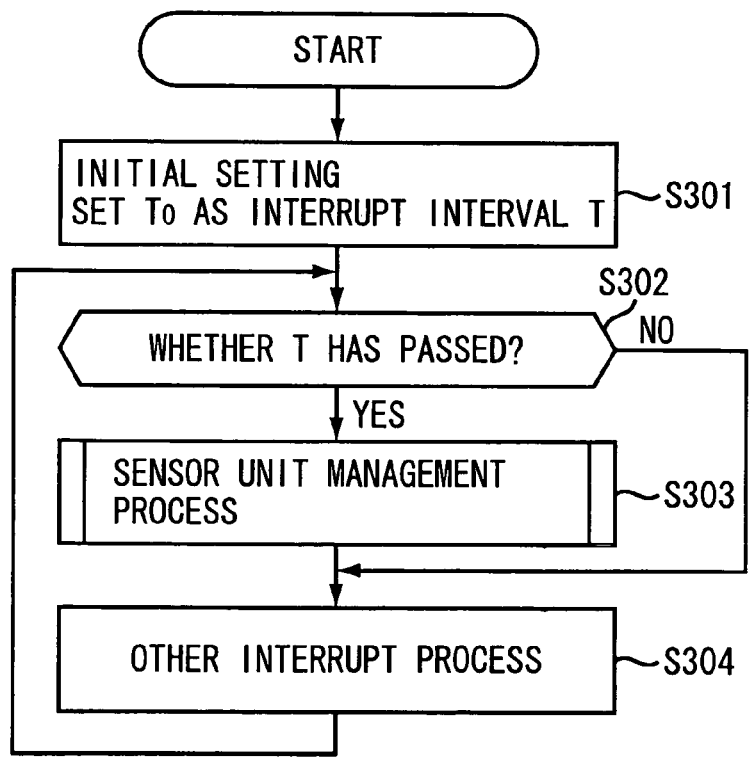
FIG. 3 is a flowchart showing a main control process procedure.
Figure 4:
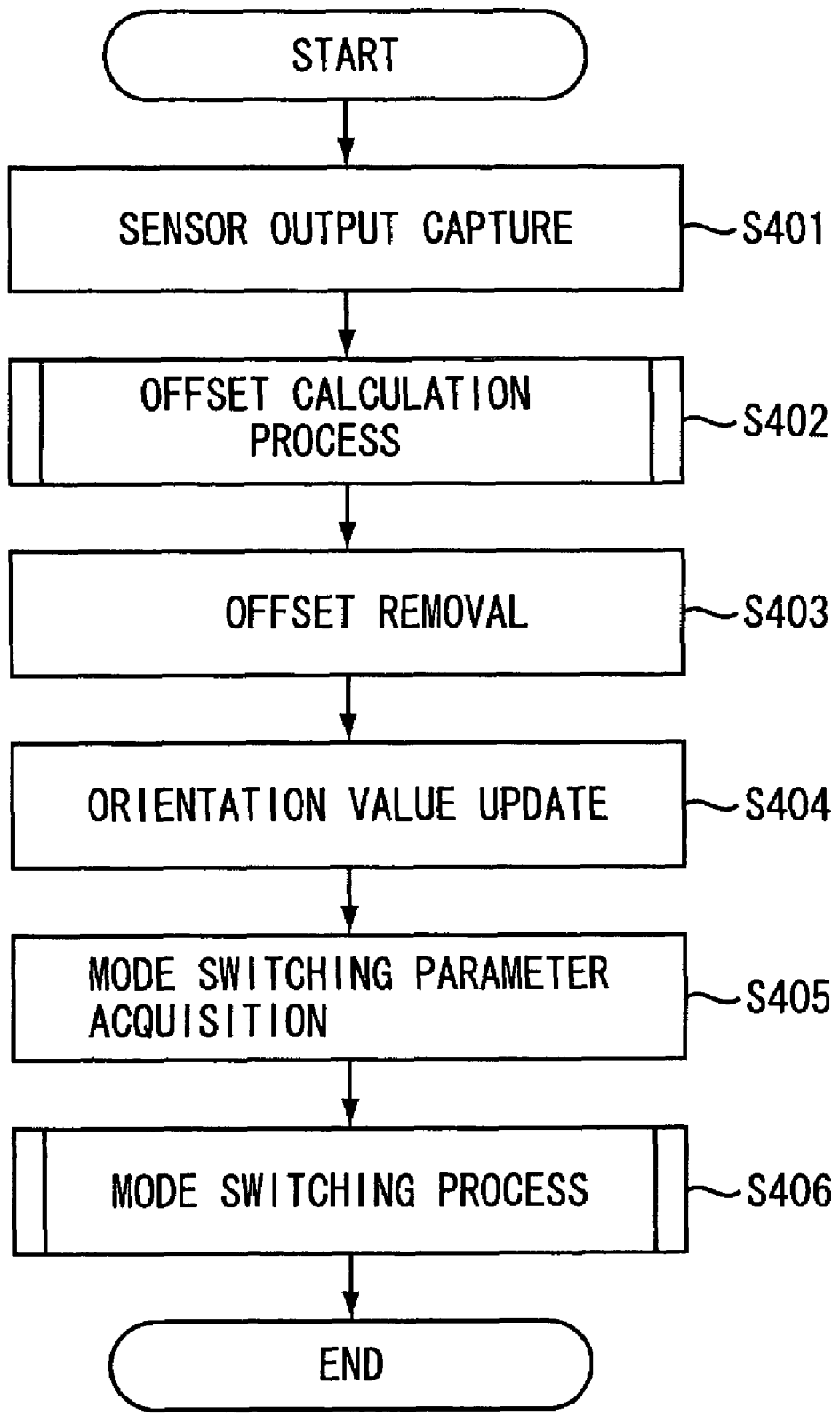
FIG. 4 is a flowchart showing a magnetic sensor management process procedure.
Figure 5:
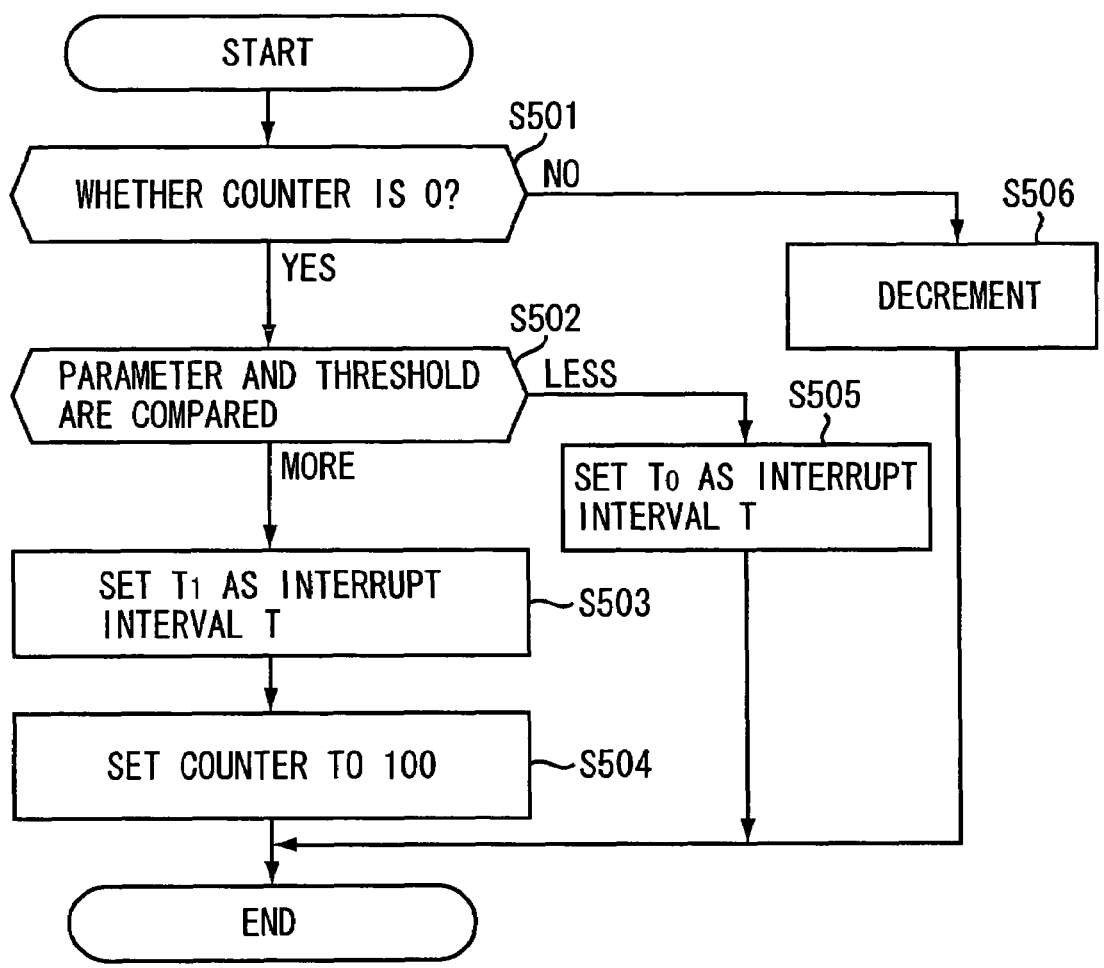
FIG. 5 is a flowchart showing a mode switching process procedure.
Figure 6:
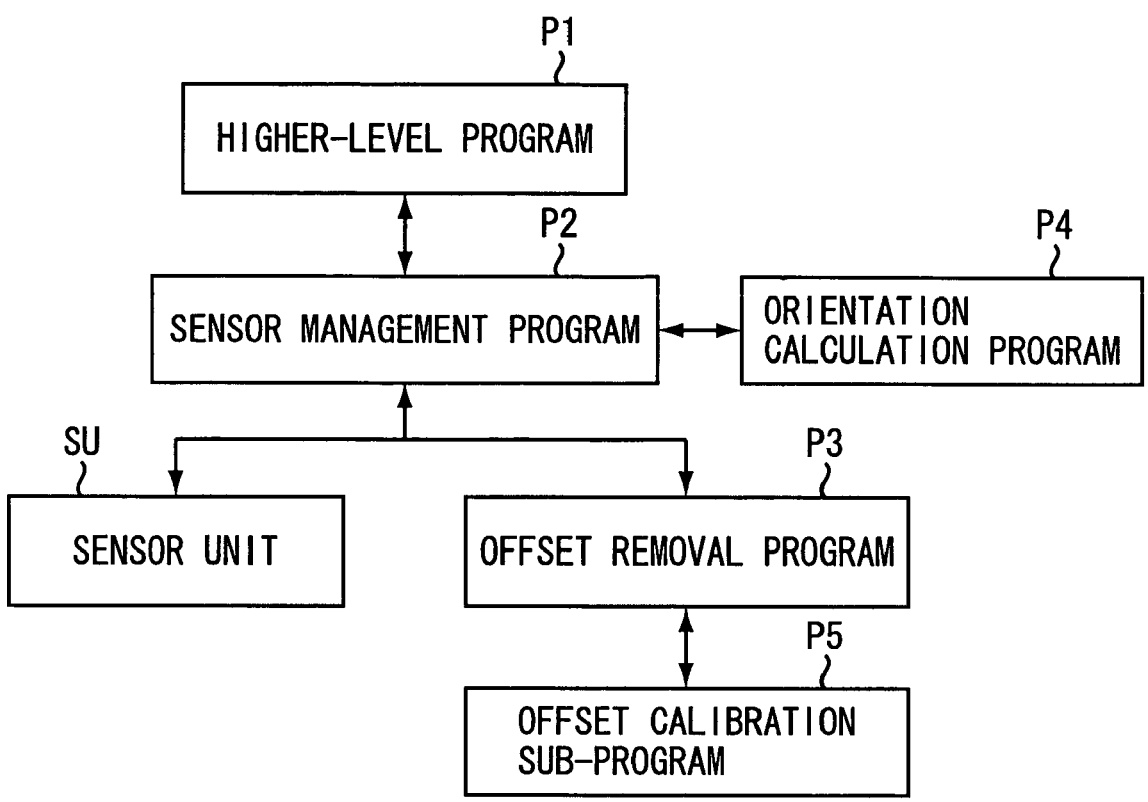
FIG. 6 is a functional block diagram showing a relation between various programs and a sensor unit.

FIGS. 3 to 5 are flowcharts of a process procedure of the main control part, mainly an orientation calculation process and a calibration process. FIG. 3 shows a main control process procedure, FIG. 4 shows a magnetic sensor management process procedure, and FIG. 5 shows a mode switching process procedure. Further, FIG. 6 is a functional block diagram showing a relation between various programs executed by the main control part 601 and used for the respective processing procedures and a sensor unit SU composed of the tilt sensor part 510 and the magnetic sensor part 520. A higher-level program P1 performs overall control of orientation indicating process, and enables the following programs to perform predetermined processes to acquire the orientation value and to indicate the orientation on the display part 307. A sensor management program P2 performs a sensor unit management process each time the interrupt interval T is elapsed. An offset removal program P3 performs calculation to subtract the offset from the magnetic data captured from the magnetic sensor part 520. An orientation calculation program P4 calculates the orientation based on the magnetic data after subtraction of the offset. An offset calibration program P5 calculates the offset based on the accumulated magnetic data.

As shown in FIG. 3, when the portable terminal apparatus is turned on, a higher-level program P1 starts and performs an initialization process such as chip initialization and data area initialization (S301). In the initialization process, when the process calls a sensor management program P2, a sampling interval t0 in a normal mode is specified as an interrupt interval T, and the control is returned to the higher-level program P1.

Thereafter, the higher-level program P1 performs and continues a specified interrupt process (S302, S304), and each time the interrupt interval T has passed (S302: Yes), the sensor management program P2 is called from the higher-level program P1. When called, the sensor management program P2 performs the sensor unit management process (S303).

In the sensor unit management process, as shown in FIG. 4, the sensor management program P2 captures the detection outputs from the tilt sensor part 510 and the magnetic sensor part 520 (S401). Values of the detection outputs are sent to an offset removal program P3.

The offset removal program P3 first sends the magnetic data of the respective axes, in the detection outputs, captured from the magnetic sensor part 520 to an offset calibration sub-program P5. The offset calibration sub-program P5 performs the offset calculation process (S402). The offset calculation process is such that new magnetic data is added to the magnetic data stored till then and accumulates them, and when a specific amount of the magnetic data are stored, an offset is calculated, and in the case where a calculation result is obtained, an old offset held in the offset removal program P3 is replaced by the obtained calculation result (calculated new offset).

Next, the offset removal program P3 returns a value, which is obtained by subtracting the offset presently held by the offset removal program P3 from the magnetic data passed to the offset calibration subprogram P5, to the sensor management program P2 (S403).

When the value is returned from the offset removal program P3, the sensor management program P2 first updates an orientation value (S404). That is, the sensor management program P2 passes the value returned from the offset removal program P3 to an orientation calculation program P4, and receives an orientation value calculated by the orientation calculation program P4 based on the passed value. The received orientation value is stored in a data storage area of RAM 603 used by the sensor management program P2. Incidentally, this orientation value is for answering when an orientation notification request is received from the higher-level program.

Next, the sensor management program P2 proceeds to an acquisition process of a mode switching parameter (S405). In this process, values X and Y of the X-axis and the Y-axis outputted from the tilt sensor part 510 are compared with values X0 and Y0 measured by the tilt sensor part 510 at the time of former measurement and stored in a data storage area of RAM 603, a difference between the values X, Y and the values X0, Y0 is suitably evaluated to acquire a mode switching parameter indicating the magnitude of the difference between the values X, Y and the values X0, Y0, and an advance is made to a mode switching process (S406). The values X and Y of the X-axis and the Y-axis outputted from the tilt sensor part 510 are also stored in the data storage area of RAM 603.

Besides, in this process, a simplified mode can be adopted in which only the value of the X-axis direction (widthwise component of the tilt data) outputted from the tilt sensor part 510 may be utilized to obtain the mode switching parameter. At the time of normal use, the value of the Y-axis direction (lengthwise component of the tilt data) outputted from the tilt sensor part 510 is likely to change, while the tilt value of the X-axis direction is hardly changed. On the other hand, in the case where the user swings the portable terminal apparatus with the intention of making calibration, an operation to make a swing while the lower end of the terminal unit is made the rotation center may be performed, and in the operation, the value in the X-axis direction is significantly changed. Accordingly, when only the value of the X-axis direction outputted from the tilt sensor part 510 is used to obtain the mode switching parameter, there is a merit that the swing operation can be accurately judged by a simple process.

FIG. 5 shows the mode switching process using the mode switching parameter indicating both of the differential values of X-axis and Y-axis. As shown in FIG. 5, at the mode switching process, it is first confirmed whether or not a specified counter used in this process is "0" (S501). In the case of "0" (S501: Yes), then it is confirmed whether or not the mode switching parameter is a previously set threshold or more (S502). In the case where it is equal to the threshold or more (that is, a difference obtained by comparing the value X, Y outputted from the tilt sensor part with the former outputted measurement value X0, Y0 is equal to or more than a specified value) (S502: MORE), the higher-level program P1 is notified so as to change the interrupt interval T to a sampling interval t1 (t1<t0) in a high rate mode (S503), and after "100" is set in a counter (S504), the mode switching process is ended. When the higher-level program P1 is up and initialized, the counter value is set to 0. On the other hand, in the case where the mode switching parameter is equal to the threshold or less (that is, in the case where the difference obtained by comparing the value X, Y outputted from the tilt sensor with the former outputted measurement value X0, Y0 is equal to or less than the specified value) (S502:LESS), the higher-level program P1 is notified so as to change the interrupt interval T to the sampling interval t0 in the normal mode (S505), and the mode switching process is ended.

On the other hand, at S501, in the case where the counter is not 0 (that is, in the case where the counter has a value of 1 to 100) (S501: No), the counter is decremented by 1 (S506), and the mode switching process is ended. Namely, once the high rate mode is set, the count value is set to "100" by the step S504. Then the set count value is decremented by "1" each time the process of step S506 is performed. Accordingly, once the high rate mode is set, the set high rate mode is maintained until the count value reaches to "0" and the mode switching parameter is determined under the threshold value. By such a manner, once the high rate mode is set, the high rate mode is maintained for a predetermined period (namely, the period in which the count value is decremented from "100" to "0") without returning to the normal rate mode.

Incidentally, when the mode switching process is ended, the sensor management program P2 returns the control to the higher-level program P1. That is, the process of FIG. 4 is ended, and the magnetic sensor management process (S303) of FIG. 3 is ended, and accordingly, the higher-level program P1 treats the sampling interval t0 or t1 determined by the mode switching process as the interrupt interval T of S302 and continues the process.

According to the portable terminal apparatus of this embodiment, at the normal time when a variation in orientation is small, collection and storage of data is performed at a relatively long sampling interval t0 (for example, 0.5 second), so that the load of the main control part by the collection and storage of meaningless data with a small orientation change can be reduced.

On the other hand, in the case where the user swings the portable terminal apparatus with the intention of making calibration, and the variation of the portable terminal apparatus becomes large, the normal mode shifts to the high rate mode, and the collection and storage of data is performed at the relatively short sampling interval t1 (for example, 0.1 second). Thus, a large amount of data with a large orientation change can be captured in a short time, and the calibration can be quickly executed. Thus, since the swing operation with the intention of making calibration is completed in a short time, the work load of the user can be reduced.

Although the embodiment of the invention has been described in detail, a specific structure is not limited to this embodiment, and includes also a design within the range not departing from the gist of the invention. For example, although the main control part 601 (see FIG. 1) is the CPU type control part in the foregoing description, specifically, it is possible to adopt a mode configured by a BBP (Base Band Processor) or by combination of the BBP as a main part and a DSP (Digital Signal Processor) as a sub-part.

A program installed in the BBP or the DSP is recorded on a computer readable recording medium and can be distributed, and may be distributed in such a form that part of the function is realized. For example, it may be distributed in a format of application software using a basic function provided by an OS (Operation System). Further, the program can also adopt such a form that it is provided as a so-called difference program which can realize a specified function by combination with a program of an existing system already recorded in a computer system.

The computer readable recording medium includes a storage device such as a hard disk and other nonvolatile storage devices in addition to a storage medium such as a portable magnetic disk or an magneto-optical disk. Further, it may have a form provided from another computer system through an arbitrary transmission medium such as the Internet or another network. In this case, the "computer readable recording medium" includes one storing a program for a specific time in the transmission medium, such as a volatile memory in a computer system which becomes a host or a client on the network.

Although the configuration has been described in which the control part is constructed of the coprocessor system of the BBP and DSP, a configuration in which at least a partial processor is constructed of FPGA (Field Programmable Gate Alley) can also be adopted. In this case, with respect to the distribution of circuit program information installed in the FPGA, similarly to the distribution of the program, various forms can also be adopted.

In the disclosed embodiments, the interrupt interval T which determines the sampling rate of the magnetic data and the tilt data in the portable terminal apparatus is set to the normal mode (sampling interval t0) or the high rate mode (sampling interval t1). The invention is not limited to the disclosed embodiments. Three or more of different modes for determining different interrupt intervals (sampling rates) may be selectively set to the portable terminal apparatus for sequentially capturing the magnetic data and the tilt data.

The invention claimed is:

1. A portable terminal apparatus mounted in a casing, comprising:
   a magnetic sensor that detects a magnetic field around the casing with an offset and outputs magnetic data representing the detected magnetic field;
   a tilt sensor that detects a tilt of the casing and sequentially outputs tilt data representing the detected tilt;
   a capture part that sequentially captures the magnetic data from the magnetic sensor at a given time interval;
   a calculation part that calculates the offset of the magnetic sensor based on a plurality of the magnetic data sequentially captured by the capture part;
   a detection part that detects an orientation variation of the casing based on the tilt data sequentially outputted from the tilt sensor; and
   a change part that changes the time interval for sequentially capturing the magnetic data in accordance with the detected orientation variation.

2. The portable terminal apparatus according to claim 1, wherein the detection part detects the orientation variation of the casing in terms of a temporal variation of the tilt data sequentially outputted from the tilt sensor.

3. The portable terminal apparatus according to claim 1, wherein the tilt sensor outputs the tilt data composed of a widthwise component representing a tilt in a widthwise direction of the casing and a lengthwise component representing a tilt in a lengthwise direction of the casing, and the detection part detects the orientation variation of the casing based on the widthwise components of the tilt data sequentially outputted from the tilt sensor.

4. The portable terminal apparatus according to claim 1, wherein the capture part sequentially captures the magnetic data at a normal time interval, and the change part changes the normal time interval to a fast time interval which is shorter than the normal time interval when a degree of the detected orientation variation exceeds a predetermined threshold level.

5. The portable terminal apparatus according to claim 4, wherein the change part maintains the fast time interval over a predetermined period even when the degree of the detected orientation variation falls below the predetermined threshold level within the predetermined period.

6. An offset calibration method performed in a portable terminal apparatus being mounted in a casing and having a magnetic sensor which detects a magnetic field around the casing with an offset and outputs magnetic data representing the detected magnetic field and a tilt sensor which sequentially detects a tilt of the casing and outputs tilt data representing the detected tilt, the offset calibration method comprising the steps of:

sequentially capturing the magnetic data from the magnetic sensor at a given time interval;

calculating the offset of the magnetic sensor based on a plurality of the sequentially captured magnetic data;

detecting an orientation variation of the casing based on the tilt data sequentially outputted from the tilt sensor; and changing the time interval for sequentially capturing the magnetic data in accordance with the detected orientation variation.

7. A machine readable medium for use in a portable terminal apparatus being mounted in a casing and having a processor, a magnetic sensor which detects a magnetic field around the casing with an offset and outputs magnetic data representing the detected magnetic field, and a tilt sensor which sequentially detects a tilt of the casing and outputs tilt data representing the detected tilt, the machine readable medium containing a program executable by the processor for causing the portable terminal apparatus to perform an offset calibration method comprising the steps of:

sequentially capturing the magnetic data from the magnetic sensor at a given time interval;

calculating the offset of the magnetic sensor based on a plurality of the sequentially captured magnetic data;

detecting an orientation variation of the casing based on the tilt data sequentially outputted from the tilt sensor; and changing the time interval for sequentially capturing the magnetic data in accordance with the detected orientation variation.

* * * * *